US011897725B2

(12) United States Patent
Millett et al.

(10) Patent No.: US 11,897,725 B2
(45) Date of Patent: Feb. 13, 2024

(54) ADJUSTMENT OF DROP RATE OF ELEVATOR CAR WITH ELECTROMAGNETIC BRAKE SYSTEM

(71) Applicant: Otis Elevator Company, Farmington, CT (US)

(72) Inventors: Steven M. Millett, Plainville, CT (US); Ismail Agirman, Southington, CT (US); Amir Lotfi, South Windsor, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 486 days.

(21) Appl. No.: 16/925,945

(22) Filed: Jul. 10, 2020

(65) Prior Publication Data

US 2020/0339382 A1 Oct. 29, 2020

Related U.S. Application Data

(63) Continuation of application No. 15/529,435, filed as application No. PCT/US2015/061563 on Nov. 19, 2015, now Pat. No. 10,745,239.

(Continued)

(51) Int. Cl.

*B66B 1/26* (2006.01)
*B66B 5/02* (2006.01)

(Continued)

(52) U.S. Cl.

CPC .................. *B66B 1/32* (2013.01); *B66B 5/02* (2013.01); *B66B 11/0476* (2013.01)

(58) Field of Classification Search

CPC .... B66B 1/32; B66B 1/44; B66B 1/50; B66B 1/28–32; B66B 5/00; B66B 5/0006;

(Continued)

(56) References Cited

U.S. PATENT DOCUMENTS 3,967,703 A 7/1976 Martin
4,076,093 A 2/1978 Mizuno (Continued)

FOREIGN PATENT DOCUMENTS

CN 1043680 A 7/1990
CN 1052642 A 7/1991

(Continued)

OTHER PUBLICATIONS

Barkland, et al.; "Emergency Braking Systems For Mine Elevators", Accessed Online: Mar. 20, 2019, 19 Pages. URL: https://www.scribd.com/document/247222437/Emergency-Braking-Systems-for-Mine-Elevators.

(Continued)

*Primary Examiner* — Christopher Uhlir

(74) *Attorney, Agent, or Firm* — CANTOR COLBURN LLP

(57) ABSTRACT

A braking system for an elevator includes an electromagnetic brake operably connected to an elevator car, and a control circuit operably connected to the electromagnetic brake. The control circuit includes a switching mechanism configured to selectively modify a rate of engagement of the electromagnetic brake to selectively modify a rate of deceleration of the elevator car. The switching mechanism has a first position, a second position and a third position, to selectively modify the rate of engagement.

14 Claims, 4 Drawing Sheets

Related U.S. Application Data

(60) Provisional application No. 62/083,434, filed on Nov. 24, 2014.

(51) Int. Cl.
*B66B 1/32* (2006.01)
*B66B 11/04* (2006.01)

(58) Field of Classification Search
CPC ..... B66B 5/0018; B66B 5/0031; B66B 5/028; B66B 5/04; B66B 5/06; B66B 5/14–18; H02P 7/20; H02P 7/232
See application file for complete search history.

(56) References Cited

U.S. PATENT DOCUMENTS

| | | | | |
|---|---|---|---|---|
| 5,076,399 | A * | 12/1991 | Horbruegger ........... | B66B 1/304 187/293 |
| 5,969,303 | A | 10/1999 | Piserchia et al. | |
| 6,631,790 | B2 | 10/2003 | Mattlar et al. | |
| 6,802,395 | B1 | 10/2004 | Helstrom et al. | |
| 7,036,638 | B2 | 5/2006 | Simmonds et al. | |
| 7,658,268 | B2 | 2/2010 | Kinpara et al. | |
| 7,770,698 | B2 | 8/2010 | Okamoto et al. | |
| 7,891,466 | B2 * | 2/2011 | Okamoto .................. | B66B 5/02 187/287 |
| 7,931,127 | B2 | 4/2011 | Kondo et al. | |
| 7,938,231 | B2 * | 5/2011 | Ueda ......................... | B66B 1/32 187/288 |
| 8,205,721 | B2 | 6/2012 | Korhonen et al. | |
| 8,371,420 | B2 | 2/2013 | Kondo et al. | |
| 8,439,168 | B2 | 5/2013 | Kondo et al. | |
| 2007/0103951 | A1 | 5/2007 | Ishikawa et al. | |
| 2012/0085593 | A1 | 4/2012 | Schoenauer et al. | |
| 2012/0111670 | A1 | 5/2012 | Fargo et al. | |
| 2013/0105248 | A1 | 5/2013 | Martinelli et al. | |
| 2017/0362051 | A1 | 12/2017 | Millet et al. | |

FOREIGN PATENT DOCUMENTS

| | | | |
|---|---|---|---|
| CN | 1279208 | A | 1/2001 |
| CN | 1406857 | A | 4/2003 |
| CN | 1433373 | A | 7/2003 |
| CN | 101090854 | A | 12/2007 |
| CN | 101163634 | A | 4/2008 |
| CN | 101223097 | A | 7/2008 |
| CN | 101367480 | A | 2/2009 |
| CN | 101044080 | B | 5/2011 |
| CN | 102348626 | A | 2/2012 |
| CN | 102459050 | A | 5/2012 |
| CN | 102471010 | A | 5/2012 |
| CN | 102762481 | A | 10/2012 |
| CN | 103328362 | A | 9/2013 |
| CN | 101903274 | B | 10/2013 |
| CN | 102307802 | B | 3/2014 |
| CN | 103738808 | A | 4/2014 |
| EP | 0037404 | B1 | 5/1985 |
| EP | 1292524 | B1 | 8/2004 |
| EP | 1767995 | A | 5/2006 |
| EP | 2048105 | A1 | 4/2009 |
| EP | 2107029 | A1 | 10/2009 |
| EP | 2221267 | A1 | 8/2010 |
| EP | 2020395 | B1 | 1/2011 |
| EP | 1731467 | B1 | 11/2011 |
| EP | 2399858 | A1 | 12/2011 |
| EP | 2537790 | A1 | 12/2012 |
| EP | 1997763 | A4 | 7/2013 |
| JP | 08198542 | A | 8/1996 |
| JP | 2003221171 | A | 8/2003 |
| WO | 2012105986 | A1 | 8/2012 |
| WO | 2014029901 | A1 | 2/2014 |

OTHER PUBLICATIONS

Chinese Office Action Issued In CN Application No. 201580065220.5, dated Dec. 10, 2019, 12 Pages.
Chinese Office Action Issued In CN Application No. 201580065220.5, dated Oct. 31, 2018, 9 Pages.
International Search Report and Written Opinion; International Application No. PCT/US2015/061563; International Filing Date: Nov. 19, 2015; dated Feb. 8, 2016; 11 pages.
Marchitto, et al., "Electrically Assisted Braking Using DC Hoist Motors", Accessed Online: Mar. 21, 2019, Issued: Feb. 2011, 14 Pages. URL: https://www.scribd.com/document/247222437/Emergency-Braking-Systems-for-Mine-Elevators.

* cited by examiner

ADJUSTMENT OF DROP RATE OF ELEVATOR CAR WITH ELECTROMAGNETIC BRAKE SYSTEM

CROSS-REFERENCE TO RELATED APPLICATIONS

This application is a continuation of U.S. application Ser. No. 15/529,435 filed May 24, 2017 which is a National Stage Application of PCT/US2015/061563 filed Nov. 19, 2015 which claims the benefit of U.S. Provisional Application No. 62/083,434, filed Nov. 24, 2014, which are incorporated herein by reference in their entirety.

BACKGROUND

The subject matter disclosed herein relates to elevator systems. More specifically, the present disclosure relates to elevator systems equipped with electromagnetic brake systems.

The use of electromagnetic brake systems is increasing in popularity in elevator systems. In emergency stop operation of these devices, such as during power interruptions or faults in the elevator system safety chain, the engagement of the brakes may result in a harsh feeling for passengers in the elevator car due to the abrupt deceleration of the elevator car. This is especially true in a downward travelling elevator car, when the brake forces and gravitational forces are acting in the same direction. Code bodies worldwide have restricted the performance of the electromagnetic brakes to address potential risks to passengers in these conditions.

In conventional roped elevator systems, due to heavier cars and counterweights and larger drive machine inertia, the rate of deceleration was relatively low. In newer elevator systems, elevator cars are much lighter, overall system inertia is lower, and the many systems are driven by traction belts, all which contribute to higher rates of deceleration during an emergency stop event. Further, the high rate of deceleration may result in belt slippage, which is unacceptable to certain code authorities.

SUMMARY

In one embodiment, a braking system for an elevator includes an electromagnetic brake operably connected to an elevator car. A control circuit is operably connected to the electromagnetic brake and includes a switching mechanism configured to selectively modify a rate of engagement of the electromagnetic brake to selectively modify a rate of deceleration of the elevator car.

Additionally or alternatively, in this or other embodiments the switching mechanism is a latching relay to selectively modify the rate of engagement of the electromagnetic brake depending on a position of the latching relay.

Additionally or alternatively, in this or other embodiments the switching mechanism changes from a first position to a second position as a result of a direction of elevator car travel and a load imbalance between the elevator car and a counterweight.

Additionally or alternatively, in this or other embodiments the switching mechanism changes from the first position to the second position at a beginning of an elevator car run.

Additionally or alternatively, in this or other embodiments in the first position the switching mechanism directs electrical current across a snubber diode to slow dissipation of current in the control circuit in the event of a loss of AC power to the control circuit, thereby slowing engagement of the electromagnetic brake relative to when the switching mechanism is in the second position.

Additionally or alternatively, in this or other embodiments in the first position the switching mechanism further directs electrical current across a resistor to speed engagement of the electromagnetic brake.

Additionally or alternatively, in this or other embodiments an AC power detection relay at the control circuit directs electrical current across the snubber diode only in the event of a loss of AC power to the elevator system.

Additionally or alternatively, in this or other embodiments an initial current applied through the circuit is changed based on a position of the switching mechanism.

In another embodiment, a method of engaging an electromagnetic brake for an elevator system includes detecting one or more operational characteristics of the elevator system and selecting a first position or a second position of a switching mechanism positioned at a brake control circuit depending on the sensed operational characteristics. Electrical current is directed through one or more components of the brake control circuit, depending on the position of the switching mechanism, to determine a rate of engagement of the electromagnetic brake. A flow of electrical current through the brake control circuit is stopped, thereby causing engagement of the electromagnetic brake.

Additionally or alternatively, in this or other embodiments the switching mechanism changes from the first position to the second position as a result of a direction of elevator car travel and a load imbalance between the elevator car and a counterweight.

Additionally or alternatively, in this or other embodiments the switching mechanism changes from the first position to the second position at a beginning of an elevator car run.

Additionally or alternatively, in this or other embodiments in the first position the switching mechanism directs electrical current across a snubber diode to slow dissipation of current in the control circuit in the event of a loss of AC power to the control circuit, thereby slowing engagement of the electromagnetic brake relative to when the switching mechanism is in the second position.

Additionally or alternatively, in this or other embodiments in the first position the switching mechanism further directs electrical current across a resistor to speed engagement of the electromagnetic brake.

Additionally or alternatively, in this or other embodiments an AC power detection relay at the control circuit directs electrical current across the snubber diode only in the event of a loss of AC power to the elevator system.

Additionally or alternatively, in this or other embodiments an initial current applied through the circuit is changed based on a position of the switching mechanism.

In yet another embodiment an elevator system includes a hoistway and an elevator car movable along the hoistway. A machine is operably connected to the elevator car to urge movement of the elevator car along the hoistway and an electromagnetic brake is operably connected to the machine to slow or stop movement of the elevator car. A control circuit is operably connected to the electromagnetic brake and includes a switching mechanism configured to selectively modify a rate of engagement of the electromagnetic brake to selectively modify a rate of deceleration of the elevator car.

Additionally or alternatively, in this or other embodiments the switching mechanism is a latching relay to selectively modify the rate of engagement of the electromagnetic brake depending on a position of the switching mechanism.

Additionally or alternatively, in this or other embodiments the switching mechanism changes from a first position to a second position as a result of a direction of elevator car travel and a load imbalance between the elevator car and a counterweight.

Additionally or alternatively, in this or other embodiments in the first position the switching mechanism directs electrical current across a snubber diode to slow dissipation of current in the control circuit in the event of a loss of AC power to the control circuit, thereby slowing engagement of the electromagnetic brake relative to when the switching mechanism is in the second position.

Additionally or alternatively, in this or other embodiments in the first position the switching mechanism further directs electrical current across a resistor to further slow engagement of the electromagnetic brake.

DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
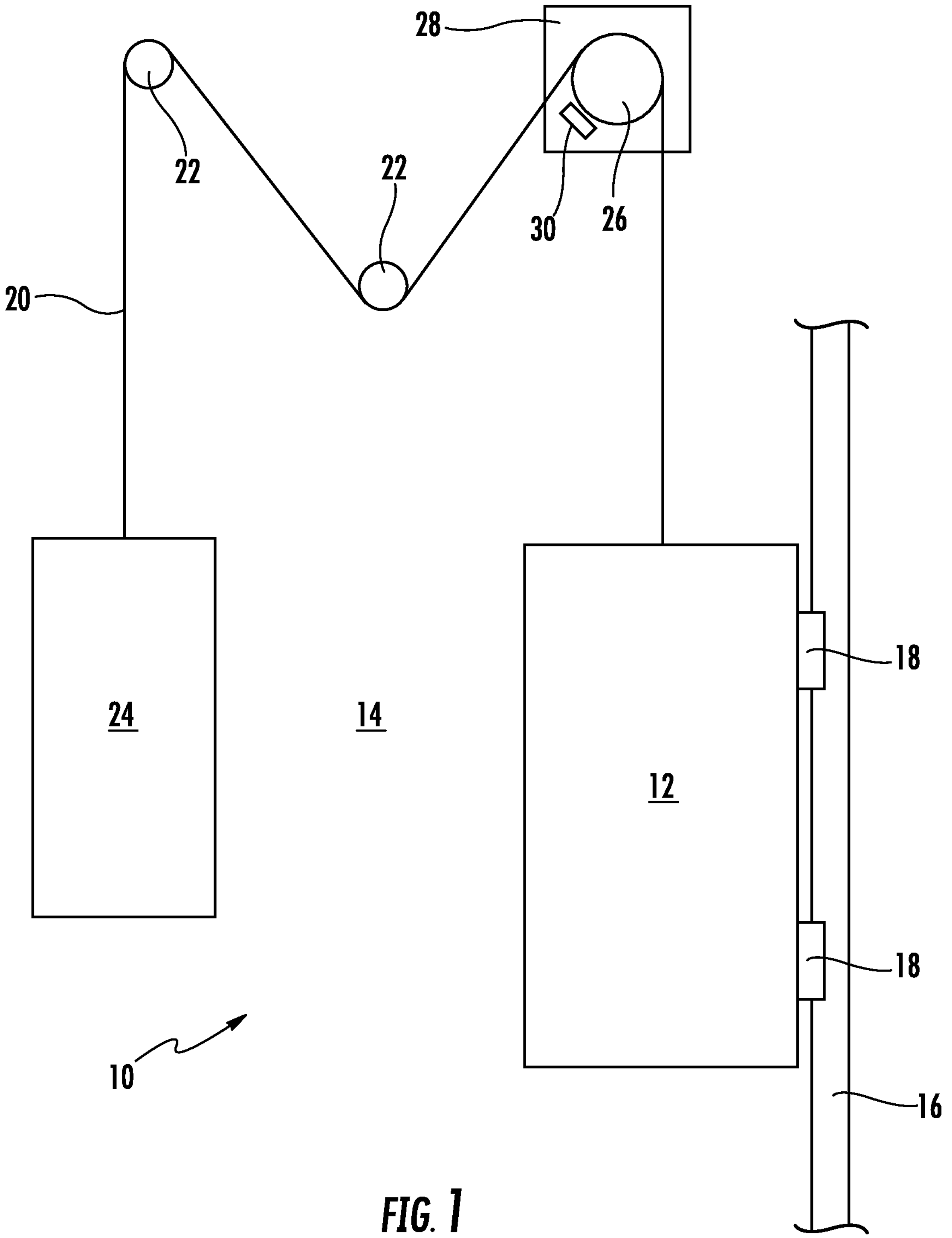
FIG. 1 is a schematic view of an embodiment of an elevator system.

The detailed description explains embodiments of the invention, together with advantages and features, by way of example with reference to the drawing.

DETAILED DESCRIPTION

Shown in FIG. 1 is an embodiment of an elevator system 10. The elevator system 10 includes an elevator car 12 located in a hoistway 14. The hoistway includes one or more guide rails 16 interactive with one or more guide shoes 18 of the elevator car 12 to guide the elevator car 12 along the hoistway. The elevator car 12 is suspended in the hoistway 14 by a suspension member 20, typically a rope and/or a belt. Although one suspension member 20 is shown in FIG. 1, it is to be appreciated that multiple suspension members 20 may be utilized. The suspension member 20 is routed over one or more pulleys or sheaves 22 and to a counterweight 24, also disposed in the hoistway 14. One or more of the sheaves may be a drive sheave 26, operably connected to a machine 28 to drive the elevator car 12 along the hoistway 14.

The elevator system 10 includes a brake 30 disposed at the drive sheave 26 to halt rotation of the drive sheave 26 and thus stop movement of the elevator car 12 in the hoistway 14 in certain select conditions such as a power failure to the elevator system 10 or an emergency stop (e-stop) situation. While in the described embodiments, the brake 30 is disposed at the drive sheave 26, it is to be appreciated that in other embodiments the brake 30 may be located at the elevator car 12 and is configured to engage the guide rail 16 thus stopping motion of the elevator car 12 in the hoistway 14. The brake 30 is an electromagnetic brake that is normally in an open position when supplied with electrical power and the electromagnets are energized. This allows free travel of the elevator car 12. When, however, the supply of electrical power to the electromagnets is stopped, the brake 30 engages, stopping the elevator car 12. In typical elevator systems 10, the electromagnetic brake 30 quickly stops the elevator car 12, but such rapid deceleration of the elevator car 12 often leads to passenger discomfort.

Figure 2:
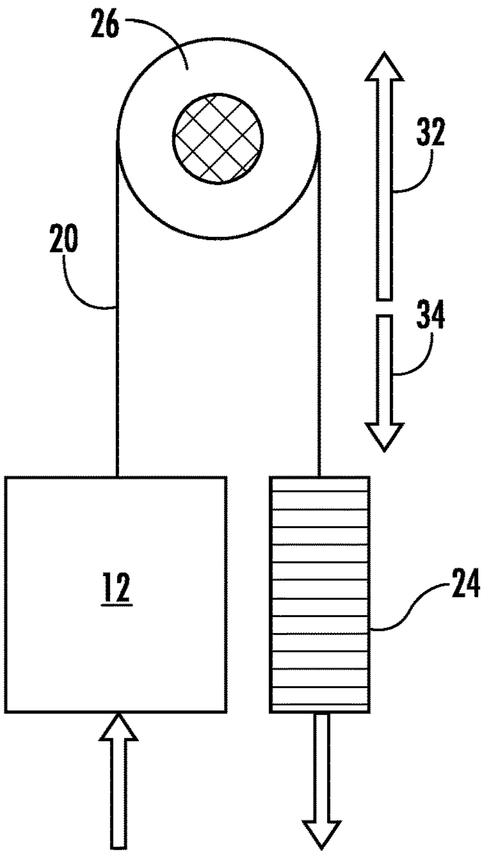
FIG. 2 is a schematic view of forces acting on an embodiment of an elevator system.
Figure 3:
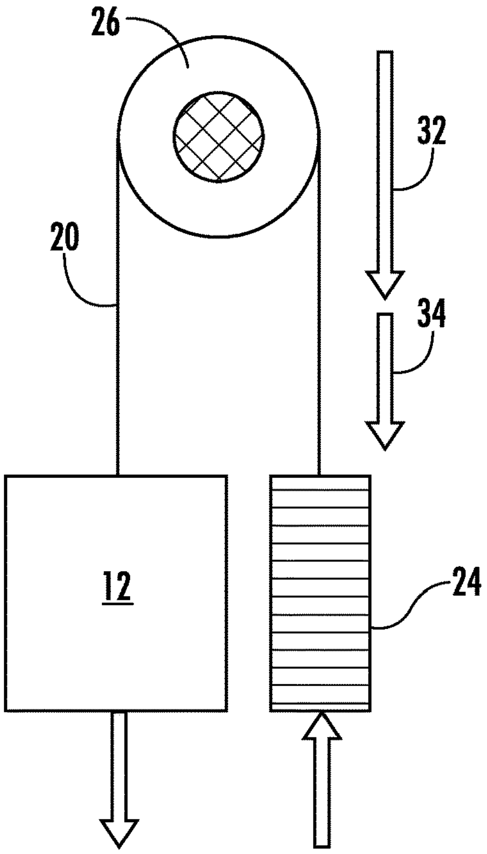
FIG. 3 is another schematic view of forces acting on an embodiment of an elevator system.

Referring to FIGS. 2 and 3, shown are two cases during operation of the elevator system 10 where the brakes 30 may be applied to stop the elevator car 12. FIG. 2 illustrates a case where the elevator car 12 is travelling upwardly. In this case, when the brake 30 is applied, a brake friction force 32 and a gravity force 34 act in opposite directions to each other. This has the effect of lowering a deceleration rate of the elevator car 12. It is desired in this case to apply full brake torque as soon as possible to reduce the risk of the elevator car 12 accelerating due to gravity.

In FIG. 3, the case illustrated is one where the elevator car 12 is travelling downwardly when the brake 30 is applied. In this case, the brake friction force 32 and the gravity force 34 act in the same direction, effectively increasing the deceleration rate of the elevator car 12 once the brake 30 is applied. It is desired in this case to delay application of full brake torque by, in some embodiments, several hundred milliseconds, and soften the application of full brake torque to slow the elevator car 12 deceleration rate. This also reduces the potential for suspension member 20 slippage when the brake 30 is engaged.

Figure 4:
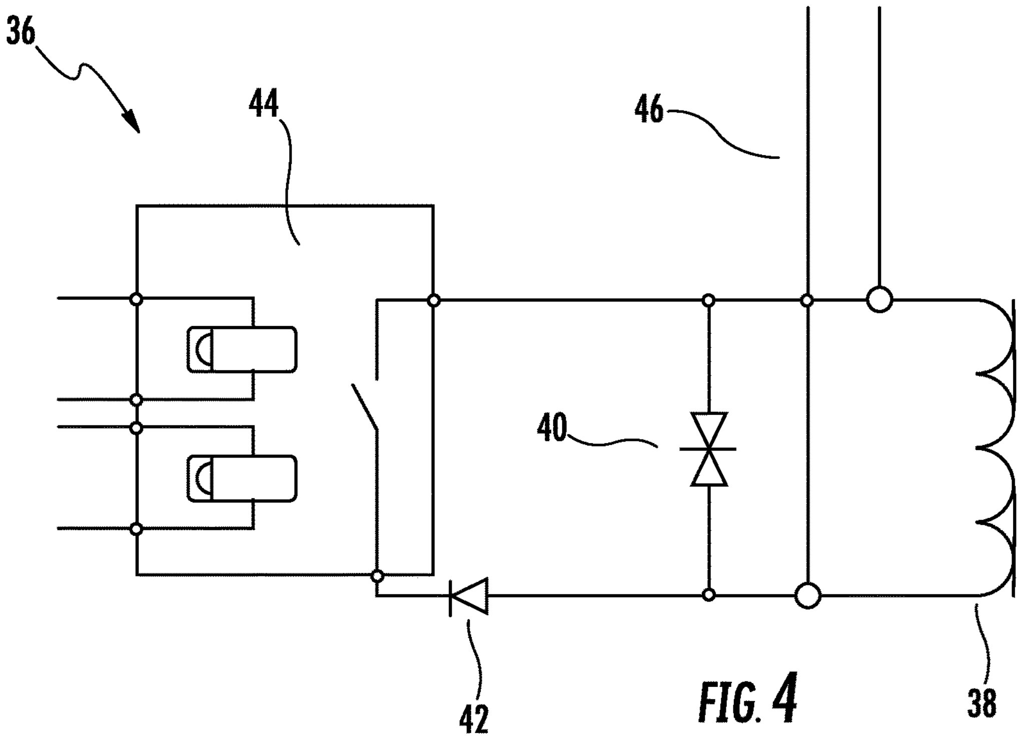
FIG. 4 is a schematic view of an embodiment of a braking control circuit for an elevator system.

Referring now to FIG. 4, an embodiment of a circuit 36 to control operation of the brake 30 is shown. The circuit 36 includes a brake coil 38, a voltage clamping device 40 and a snubber diode 42 which together with a latching relay 44, arranged in an electrically parallel relationship with the voltage clamping device 40. While a latching relay 44 is illustrated in FIG. 4 and described herein, it is to be appreciated that other switching mechanisms may be utilized in the circuit 36. For example, in other embodiments a normal, non-latching relay or an electronic switch such as a mofset may be used. Further, an additional relay may be utilized in conjunction with the mofset to "latch" the mofset. The latching relay 44 is connected to the elevator system 10 such that the relay is set to a selected position at a beginning of an elevator car 12 run, based on direction of elevator car 12 travel and/or load imbalance between the elevator car 12 and the counterweight 24. For example, as explained above, in some instances where the elevator car 12 is travelling downwardly, it may be desired to reduce a rate of deceleration of the elevator car 12 caused by application of the brake 30. If the flow of current through the electromagnetic brake coil 38 is reduced at a slower rate, the brake 30 engages at a slower rate, thus reducing the deceleration rate of the elevator car 12. To do this, the latching relay 44 is set to the closed position to activate the snubber diode 42, which will prolong current flow through the circuit 36 after loss of power from the input lines 46. In other instances, where the delay is not needed or desired, the latching relay 44 is set to the open position, deactivating the snubber diode 42. In some embodiments, when the latching relay 44 is set to the closed position, an initial current through the circuit 36 is set at an increased level, so that in the case of a power interruption or emergency stop, the current dissipates from the circuit 36 slowly, thus engaging the brake 30 slowly.

Figure 5:
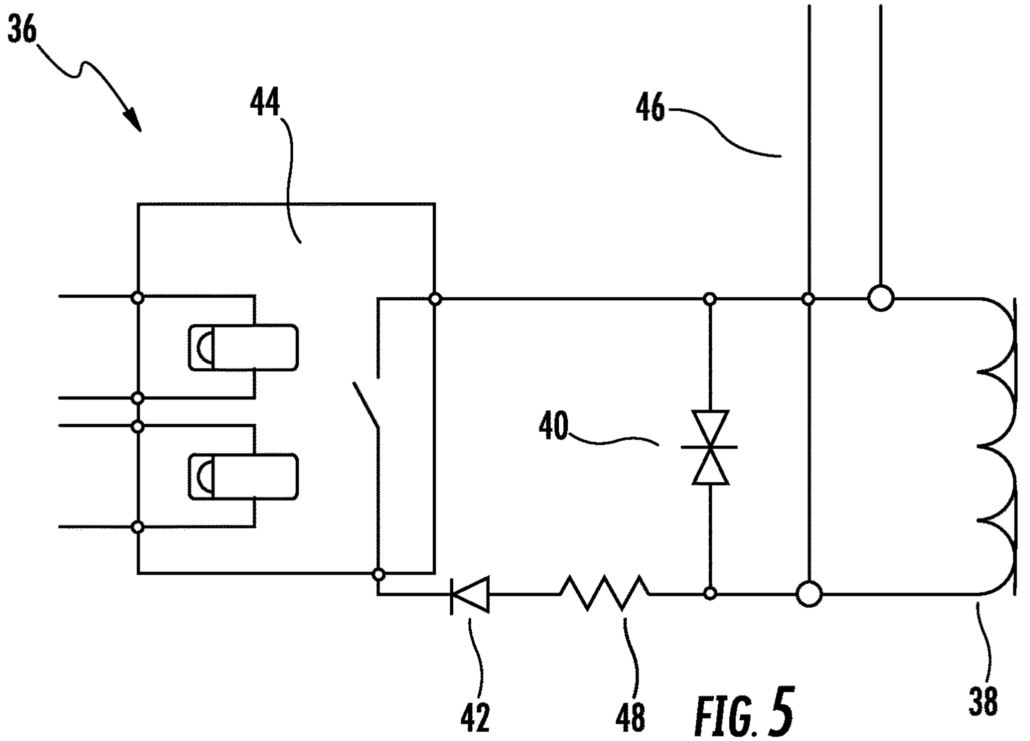
FIG. 5 is a schematic view of another embodiment of a braking control circuit for an elevator system.
Figure 6:
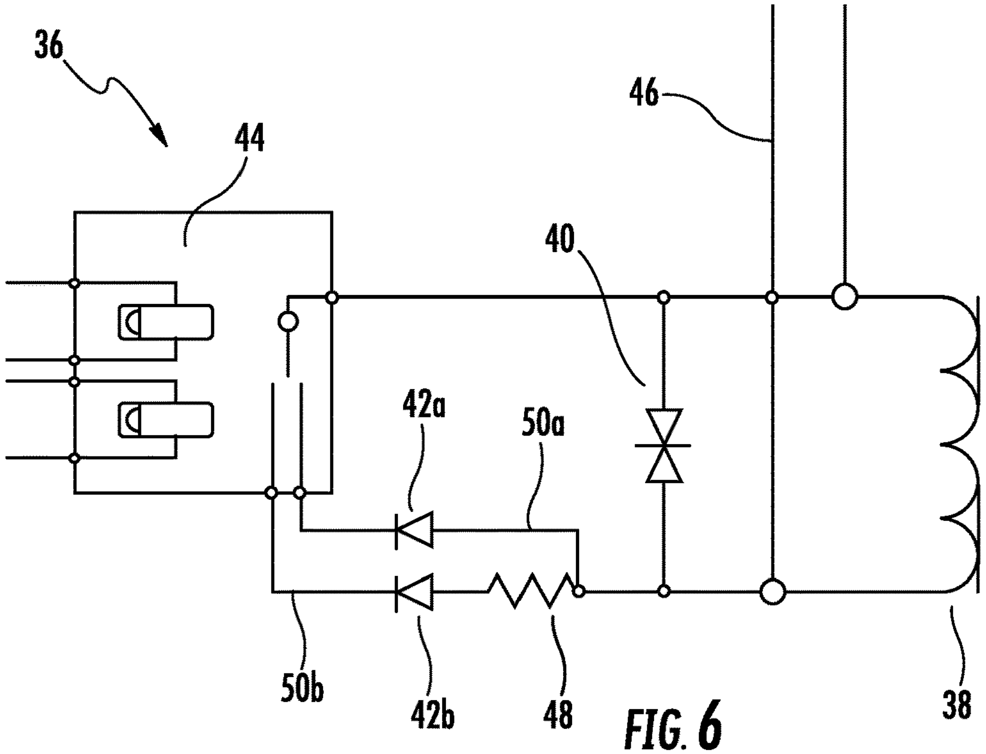
FIG. 6 is a schematic view of yet another embodiment of a braking control circuit for an elevator system.
Figure 7:
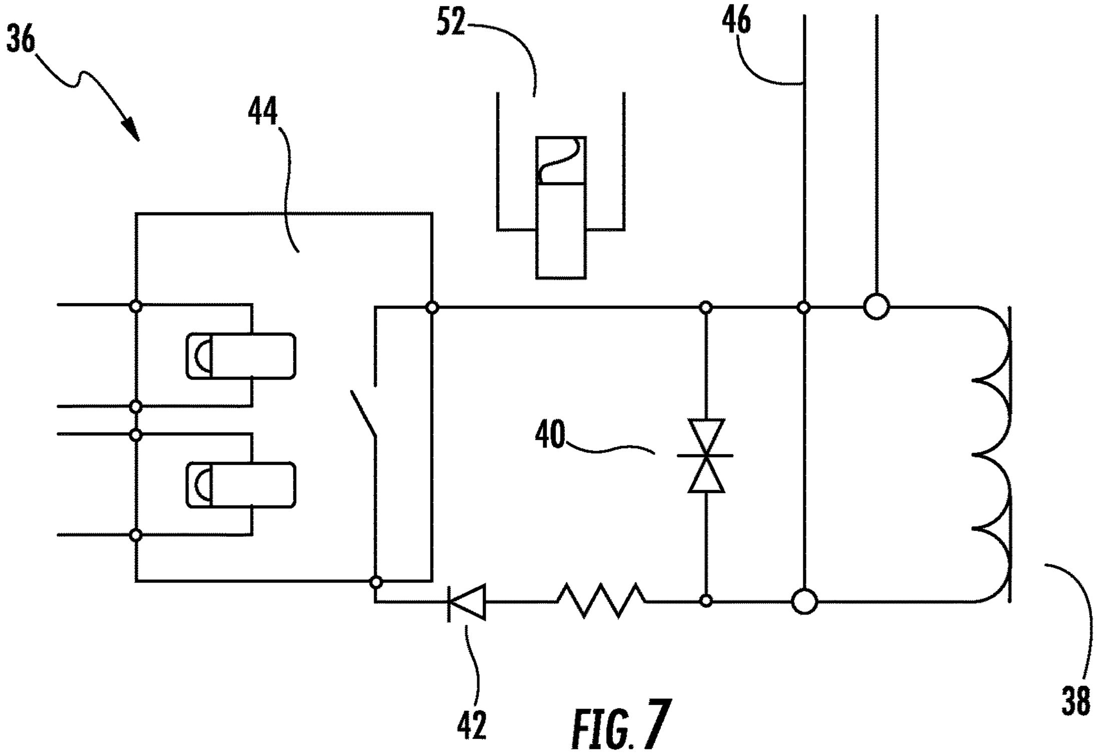
FIG. 7 is a schematic view of still another embodiment of a braking control circuit for an elevator system.

Alternative embodiments of circuit 36 are illustrated in FIGS. 5-7. In the embodiment of FIG. 5, a resistor 48 is arranged in series with the snubber diode 42 to increase the rate of brake 30 activation slightly compared to embodiments with just the snubber diode 42.

The embodiment of FIG. 6 includes a first snubber diode 42*a* located at a first branch 50*a* and a second snubber diode 42*b* and resistor 48 arranged on a second branch 50*b*, electrically parallel to the first branch 50*a*. In this embodiment, the latching relay 44 has three positions. It may be set to an opened position with no delay, closed on the first branch 50*a* to provide a first delay, or closed on the second branch 50*b* to provide a second delay, different from the first delay. The selected delay may depend on direction of travel of the elevator car 12 and/or an amount of imbalance between the elevator car 12 and the counterweight 24.

Additionally, in other cases it may be desired to only activate a delay in the event of a loss of AC power to the elevator system 10. In the embodiment of FIG. 7, the circuit 36 further includes an AC power detection relay 52, which is normally in an open position. In the event of AC power loss, the AC power detection relay 52 will close and the delay will be activated depending on the position of the latching relay 44. It is to be appreciated that the embodiments of circuits 36 shown and described herein are merely exemplary. One skilled in the art will appreciate that, for example, other combinations and arrangements of snubber diodes 42 and resistors 48 may be utilized to provide desired amounts of delay. Further, some elevator systems may utilize more than one brake 30. In such systems, each brake 30 may have its own circuit 36 including a snubber diode 42 such that each snubber diode 42 associated with each brake 30 may be independently activated.

Utilizing the latching relay 44 activates the delay of brake 30 engagement in only selected circumstances resulting in smoother operation of the elevator system 10 and reducing a possibility of passenger discomfort. This is in contrast to prior art systems in which the delay is engaged in all circumstances, so that when the heavier of the car 12 and counterweight 24 is moving downwardly, the delay may result in the system reaching an overspeed condition taking the elevator system 10 out of service and trapping passengers in the elevator car 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A braking system for an elevator comprising:

an electromagnetic brake operably connected to an elevator car; and a control circuit operably connected to the electromagnetic brake, the control circuit including a switching mechanism configured to selectively modify a rate of engagement of the electromagnetic brake to selectively modify a rate of deceleration of the elevator car;

wherein the switching mechanism has a first position, a second position and a third position, to selectively modify the rate of engagement;

wherein in the first position the switching mechanism closes on a first pathway to direct electrical current along the first pathway having a snubber diode to slow dissipation of current in the control circuit in an event of a loss of AC power to the control circuit; and wherein in the second position the switching mechanism closes on a second pathway to direct directs electrical current along the second pathway arranged in parallel to the first pathway and including a snubber diode and a resistor;

wherein in the third position the switching mechanism is in an open position such that deceleration is not delayed.

2. The braking system of claim 1, wherein the switching mechanism changes between the first position, the second position and the third position as a result of a direction of elevator car travel and a load imbalance between the elevator car and a counterweight.

3. The braking system of claim 1, wherein in the first position an application of full torque of the brake is delayed by a first delay amount, and in the second position the application of full torque of the brake is delayed by a second delay amount different from the first delay amount.

4. The braking system of claim 3, wherein in the third position the application of full torque of the brake is not delayed.

5. The braking system of claim 1, wherein the switching mechanism changes between the first position, the second position and the third position at a beginning of an elevator car run.

6. The braking system of claim 1, wherein the switching mechanism is a latching relay.

7. The braking system of claim 1, wherein an initial current applied through the circuit is changed based on a position of the switching mechanism.

8. A method of engaging an electromagnetic brake for an elevator system comprising:

detecting one or more operational characteristics of the elevator system;

selecting a first position, a second position or a third position of a switching mechanism disposed at a brake control circuit depending on the one or more detected operational characteristics;

flowing electrical current through one or more components of the brake control circuit, depending on the position of the switching mechanism, to determine a rate of engagement of the electromagnetic brake; and stopping a flow of electrical current through the brake control circuit, thereby causing engagement of the electromagnetic brake;

wherein in the first position the switching mechanism closes on a first pathway to direct electrical current along the first pathway having a snubber diode to slow dissipation of current in the control circuit in an event of a loss of AC power to the control circuit; and wherein in the second position the switching mechanism closes on a second pathway to direct electrical current along the second pathway arranged in parallel to the first pathway and including a snubber diode and a resistor; and wherein in the third position the switching mechanism is in an open position such that deceleration is not delayed.

9. The method of claim 8, wherein in the first position an application of full torque of the brake is delayed by a first delay amount, and in the second position the application of full torque of the brake is delayed by a second delay amount different from the first delay amount.

10. The method of claim 9, wherein in the third position the application of full torque of the brake is not delayed.

11. The method of claim 8, wherein the switching mechanism changes between the first position, the second position and the third position at a beginning of an elevator car run.

12. An elevator system comprising:

a hoistway;

an elevator car movable along the hoistway;

a machine operably connected to the elevator car to urge movement of the elevator car along the hoistway;

an electromagnetic brake operably connected to an elevator car; and a control circuit operably connected to the electromagnetic brake, the control circuit including a switching mechanism configured to selectively modify a rate of engagement of the electromagnetic brake to selectively modify a rate of deceleration of the elevator car;

wherein the switching mechanism has a first position, a second position and a third position, to selectively modify the rate of engagement;

wherein in the first position the switching mechanism closes on a first pathway to direct electrical current along the first pathway having a snubber diode to slow dissipation of current in the control circuit in an event of a loss of AC power to the control circuit; and wherein in the second position the switching mechanism closes on a second pathway to direct electrical current along the second pathway arranged in parallel to the first pathway and including a snubber diode and a resistor; and wherein in the third position the switching mechanism is in an open position such that deceleration is not delayed.

13. The elevator system of claim 12, wherein in the first position an application of full torque of the brake is delayed by a first delay amount, and in the second position the application of full torque of the brake is delayed by a second delay amount different from the first delay amount.

14. The elevator system of claim 13, wherein in the third position the application of full torque of the brake is not delayed.

* * * * *